T. J. MAYALL.
Hose-Couplings.

No. 144,997.

Patented Nov. 25, 1873.

Witnesses

Inventor.

UNITED STATES PATENT OFFICE.

THOMAS J. MAYALL, OF BOSTON, MASSACHUSETTS.

IMPROVEMENT IN HOSE-COUPLINGS.

Specification forming part of Letters Patent No. 144,997, dated November 25, 1873; application filed October 9, 1873.

*To all whom it may concern:*

Be it known that I, THOMAS J. MAYALL, of Boston, Massachusetts, have invented certain new and useful Improvements in Couplings for Hose and like purposes, of which the following is a specification:

This invention is principally designed to afford a better, more convenient, and more readily applicable coupling for hose than the ordinary screw-coupling at present generally used. To accomplish this result I combine, with collars applied to the contiguous ends of the hose-sections to be coupled, a coupling or clamping ring adapted to close around said collars, the parts being constructed as hereinafter described, so that the ring, in the act of closing on the collar, will draw them closely and tightly together. In the contiguous faces of the collars packing-rings are inserted by which the joint between them, when they are brought or drawn together, can be, to all intents and purposes, hermetically closed; and for the purpose of clamping the ring onto and around the collar I employ a pivoted locking-lever on one end of the ring and a swiveled cross-pin on the other end of said ring, which pin, when the ring is to be closed upon the collars, is inserted through a slot in the lever, and is then turned crosswise, so that its ends will catch over the opposite sides of the slot. By then pulling back the lever the two ends of the ring will be drawn together, and the ring thus tightly closed on the collars, the lever being so arranged that when drawn far enough back it will remain in such position and be self-locking. The cross-pin is made adjustable, so that it may be projected more or less from the end of the ring on which it is located, and the coupling-ring is divided into two halves or semicircles, which are hinged together permanently, thus allowing the ring, when the locking devices are disengaged, to be readily removed from the coupling-collar.

The nature of my invention, and the manner in which the same is or may be carried into effect, will be readily understood by the reference to the accompanying drawing, in which—

Figure 1:
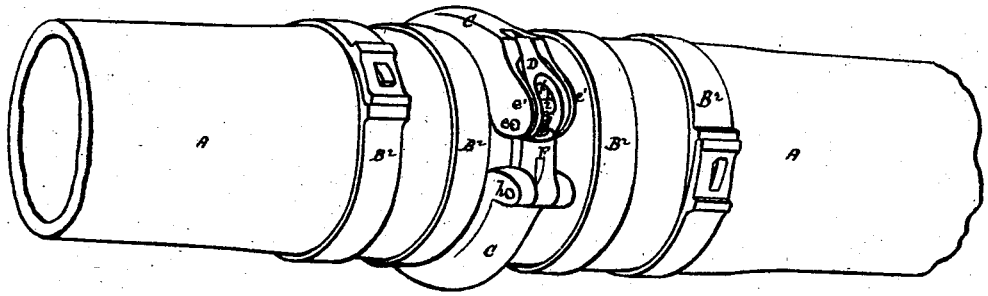
Figure 2:
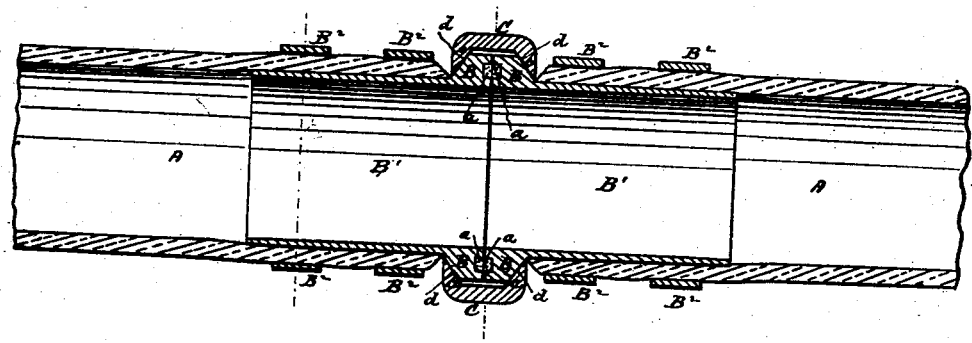
Figure 3:
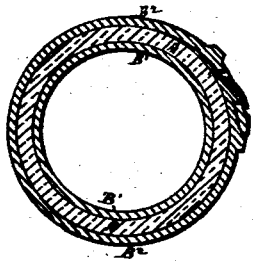
Figure 4:
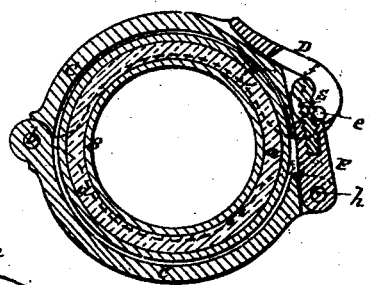
Figure 5:
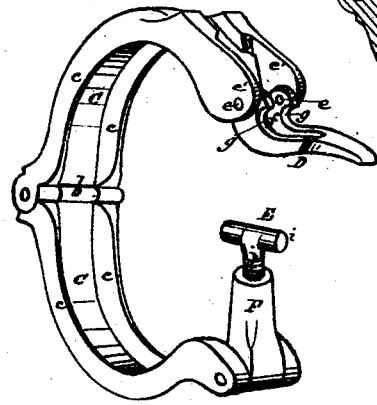

Figure 1 is a perspective view of a portion of two lengths of hose provided with my coupling. Fig. 2 is a longitudinal central section of the same. Fig. 3 is a section on the line $x$ $x$, Fig. 2. Fig. 4 is a section on line $y$ $y$, Fig. 2. Fig. 5 is a perspective view of the coupling-ring and its locking devices detached.

Each hose-section A, at the end which is to be coupled, is provided with a metallic collar, B, which may be secured to the hose in any convenient way. In the present instance this is accomplished by forming the collar on the exterior end of a metallic thimble or tube, B¹, fitting within the end of the hose-section, and there secured by means of external bands or ties B² clasping tightly the hose and binding it onto the internal thimble B'. For the purpose of making tight joint between the coupled sections, packing-rings $a$, of rubber or other suitable material, are inserted in or fixed on the outer or contiguous faces of the collars, so as to somewhat project therefrom. The collars of the two sections or lengths to be coupled are put together, as represented in Figs. 2 and 3. In order to hold and bind them together I employ a coupling-ring, C, composed of two parts hinged together at $b$. This ring is provided with side flanges $c$ $c$, which embrace the collars on their exterior opposite sides. These sides $d$ of the collars are made inclined or beveled, as shown, and the side flanges $c$ $c$ of the ring C are correspondingly inclined or beveled, so as to fit onto the parts $d$ of the collars. By reason of this formation of the ring and collars, the former, when applied to said collars, will tend, as it closes upon them, to draw them tightly together. The means for closing and locking the coupling-ring are shown clearly in Fig. 5. At one extremity of the ring is a locking-lever, D, pivoted at $e$, between ears $e'$ on the end of ring C. This lever is forked for some distance in advance of its pivotal point, forming an aperture or slot, $f$, through which the locking-pin hereinafter described can pass. Between the pivotal point $e$ of the lever and its other end are formed, at $g$, recesses or bearings, in which the ends of the swiveled locking-pin, after passing through the slot $f$, will catch. The swiveled locking-pin is shown at E as attached to the other end of the ring. It is held in an arm, F, pivoted at $h$ to the end of the ring. The pin E is of T shape, being composed of a cross-head or pin proper, $i$, and a central stem, $j$, held and adapted to turn in the end of arm F. This stem is made to turn or swivel, in order that the cross-pin $i$ may first be turned in order to coincide with and pass through slot $f$, and afterward turned so as to be crosswise of the slot, in which case its ends will catch and rest on the bearing-places $g$. In order to allow at the same time the pin to be adjusted out or in, and thus cause the ring to be drawn together more or less, as desired, I screw-thread the stem $j$, and provide for it a correspondingly screw-threaded socket in arm F, so that by the same means provision is made for the adjustment of the pin, as well as its swiveling action.

In applying the coupling-ring it is first opened and fitted around the collars B B, which are placed together, as shown. The locking-pin is then turned in the position represented in Fig. 5, and the two parts of the ring are pressed together until the pin passes entirely through slot $f$. Pin E is then turned until cross-head $i$ lies crosswise of the slot. The locking-lever D is now drawn back, the end of the locking-pin catching and resting in the hook-bearings $g$, and this movement of the lever draws together the two ends of the ring. The lever, when drawn back far enough, will shut down on the ring with a snap, and will lie securely between the ear $e'$, this being due to the relative position of the bearings $g$ of the pin and the pivot $e$ of the lever, as seen in Fig. 4, the bearings $g$ of the pin being between the pivot $e$ and the ring, so that the draft of the pin on the lever will naturally tend to draw the latter forcibly down onto the ring. The outer or free end of the lever is slightly curved or bent outward, as seen in Fig. 4, to admit of the insertion of the hand, or some instrument, between the lever and the ring, in order to raise or lift the lever when it is desired to uncouple the section.

This coupling is adapted not only for hose, but for soda-fountains, and in any other connection where a coupling is employed.

Having described my invention, what I claim, and desire to secure by Letters Patent, is—

1. In combination with the divided and hinged coupling-ring, the locking-lever and swiveled and adjustable locking-pin, said parts being applied to the respective ends of the coupling-ring, and constructed and arranged for joint operation, substantially as shown and set forth.

2. The coupling-collars, having their exterior opposite sides inclined or beveled, and provided with packing-rings on their contiguous faces, in combination with the divided and hinged coupling-ring, locking-lever, and swiveled locking-pin, said parts being constructed and arranged for joint operation, substantially as described.

THOS. J. MAYALL.

Witnesses:
A. W. ADAMS,
M. BAILEY.